(12) United States Patent
Pratt

(10) Patent No.: US 10,128,534 B2
(45) Date of Patent: Nov. 13, 2018

(54) MICROSPHERE COMPOSITE ELECTROLYTE

(75) Inventor: Russell Clayton Pratt, Foster City, CA (US)

(73) Assignee: Seeo, Inc., Hayward, CA (US)

( * ) Notice: Subject to any disclaimer, the term of this patent is extended or adjusted under 35 U.S.C. 154(b) by 94 days.

(21) Appl. No.: 13/261,822

(22) PCT Filed: Aug. 28, 2012

(86) PCT No.: PCT/US2012/052730
§ 371 (c)(1),
(2), (4) Date: Feb. 4, 2015

(87) PCT Pub. No.: WO2013/033126
PCT Pub. Date: Mar. 7, 2013

(65) Prior Publication Data
US 2015/0155592 A1  Jun. 4, 2015

Related U.S. Application Data

(60) Provisional application No. 61/530,406, filed on Sep. 2, 2011.

(51) Int. Cl.
*H01M 10/0565* (2010.01)
*H01B 1/12* (2006.01)
(Continued)

(52) U.S. Cl.
CPC ........ *H01M 10/0565* (2013.01); *H01B 1/122* (2013.01); *H01M 4/382* (2013.01);
(Continued)

(58) Field of Classification Search
CPC .................................................. H01M 10/0565
See application file for complete search history.

(56) References Cited

U.S. PATENT DOCUMENTS

| | | | | | |
|---|---|---|---|---|---|
| 6,096,234 A | * | 8/2000 | Nakanishi | ............. | H01M 6/181 |
| | | | | | 252/62.2 |
| 6,280,484 B1 | * | 8/2001 | Kelder | .................. | H01M 4/621 |
| | | | | | 29/623.1 |

(Continued)

FOREIGN PATENT DOCUMENTS

| | | | |
|---|---|---|---|
| JP | 2008123941 A | * | 5/2008 |
| WO | 2006025662 A1 | | 3/2006 |
| WO | 2009092058 A1 | | 7/2009 |

OTHER PUBLICATIONS

Song et al, A phase diagram for jammed matter, Nature Letters, vol. 453, 629, May 29, 2008.
(Continued)

*Primary Examiner* — Sarah A. Slifka
*Assistant Examiner* — Brian R Ohara
(74) *Attorney, Agent, or Firm* — R'Sue Popowich Caron

(57) ABSTRACT

A polymer electrolyte material that has both structural and conductive phases and is easy and inexpensive to manufacture is provided. The material has rigid spheres in a close-packed arrangement. Some or essentially all of the spheres are connected to their nearest neighbors through a fusion process. A solution of conductive electrolyte fills the interstices. Such an electrolyte offers excellent resistance to growth of lithium dendrites in secondary lithium battery cells.

21 Claims, 3 Drawing Sheets

(51) Int. Cl.
  *H01M 4/38* (2006.01)
  *H01M 4/485* (2010.01)
  *H01M 10/052* (2010.01)
  *H01M 10/0525* (2010.01)
  *H01M 10/056* (2010.01)
  *H01M 10/0562* (2010.01)

(52) U.S. Cl.
  CPC ......... *H01M 4/485* (2013.01); *H01M 10/052* (2013.01); *H01M 10/056* (2013.01); *H01M 10/0525* (2013.01); *H01M 10/0562* (2013.01); *H01M 2300/0071* (2013.01); *H01M 2300/0082* (2013.01); *H01M 2300/0088* (2013.01)

(56) References Cited

U.S. PATENT DOCUMENTS

| | | | |
|---|---|---|---|
| 8,993,174 B2 | 3/2015 | Kwon | |
| 2001/0020084 A1* | 9/2001 | Aoki | C08G 65/332 528/392 |
| 2004/0005503 A1* | 1/2004 | Iwakura | H01M 2/145 429/303 |
| 2004/0166407 A1* | 8/2004 | Nakajima | H01M 2/1646 429/217 |
| 2006/0046149 A1* | 3/2006 | Yong | H01M 2/166 429/251 |
| 2006/0246355 A1* | 11/2006 | Min | H01M 2/145 429/322 |
| 2007/0122716 A1* | 5/2007 | Seo | H01M 2/1646 429/251 |
| 2007/0172739 A1* | 7/2007 | Visco | H01B 1/122 429/322 |
| 2009/0023074 A1* | 1/2009 | Matsui | H01M 10/0569 429/326 |
| 2009/0092902 A1* | 4/2009 | Abouimrane | H01M 10/052 429/306 |
| 2009/0226790 A1* | 9/2009 | Kanamura | B32B 18/00 429/493 |
| 2009/0263725 A1 | 10/2009 | Balsara | |
| 2012/0100417 A1* | 4/2012 | Ramprasad | H01M 10/052 429/163 |
| 2014/0093784 A1 | 4/2014 | Kwon | |
| 2014/0234726 A1 | 8/2014 | Christensen | |
| 2015/0086837 A1 | 3/2015 | Laramie | |

OTHER PUBLICATIONS

Schaefer et al, "Nanoporous hybrid electrolytes," J. Mater. Chem., 2011, 21, 10094.
Zhang, Jiawei et al., "Novel PEO-based solid composite polymer electrolytes with inorganic-organic hybrid polyphosphazene microspheres as fillers," Journal of Applied Electrochemistry, vol. 40, pp. 1475-1481, Apr. 10, 2010.

* cited by examiner

MICROSPHERE COMPOSITE ELECTROLYTE

CROSS-REFERENCE TO RELATED APPLICATIONS

This application claims priority to U.S. Provisional Patent Application 61/530,406, filed Sep. 2, 2011 and to International Application Number PCT/US12/52730, filed Aug. 28, 2013, both of which are incorporated by reference herein.

BACKGROUND OF THE INVENTION

Field of the Invention

This invention relates generally to a newly-synthesized two-phase polymer electrolyte material, and, more specifically, to a two-phase polymer electrolyte that has rigid, covalently-bound microspheres embedded in a matrix of softer polymer electrolyte material.

The increased demand for lithium secondary batteries has resulted in research and development to improve their safety and performance. Many batteries employ liquid electrolytes and are associated with high degrees of volatility, flammability, and chemical reactivity. With this in mind, the idea of using a solid electrolyte with a lithium-based battery system has attracted great interest.

The lithium solid polymer electrolyte rechargeable battery is an especially attractive technology for Li-ion batteries because, among other benefits, the solid polymer electrolyte exhibits high thermal stability, low rates of self-discharge, stable operation over a wide range of environmental conditions, enhanced safety, flexibility in battery configuration, minimal environmental impacts, and low materials and processing costs. Moreover, solid polymer electrolytes may enable the use of lithium metal anodes, which offer higher energy densities than traditional lithium ion anodes.

Despite their many advantages, the adoption of solid polymer electrolytes has been curbed by the inability to develop an electrolyte that exhibits both high ionic conductivity and good mechanical properties. This difficulty arises because high ionic conductivity, according to standard mechanisms, calls for high polymer chain mobility. But high polymer chain mobility, according to standard mechanisms, tends to produce mechanically soft polymers.

As an example, a prototypical polymer electrolyte is one composed of polyethylene oxide (PEO)/salt mixtures. PEO generally offers good mechanical properties at room temperature. However, PEO is also largely crystalline at room temperature. The crystalline structure generally restricts chain mobility, reducing conductivity. Operating PEO electrolytes at high temperature (i.e., above the polymer's melting point) solves the conductivity problem by increasing chain mobility and hence improving ionic conductivity. However, the increased conductivity comes at a cost in terms of deterioration of the material's mechanical properties. At higher temperatures, the polymer is no longer rigid.

Block copolymers have been proposed as materials that may be able to exhibit both good mechanical properties and good conductivity. By using microphase separated block copolymers of two or more blocks, at least one block can impart mechanical integrity while at least one block can impart high conductivity. Polymer electrolytes are plagued by poor conductivity compared to liquid electrolytes. Polymer electrolytes conduct better at higher temperatures, and operating electrochemical cells at very high temperatures>110° C. results in conductivities similar to liquid electrolytes at room temperature. This must be balanced, however, against the melting temperature of the mechanical blocks. Thus far, no block copolymer has been reported that can be operated at high temperatures (>150° C.) while maintaining high mechanical strength.

Therefore, there has been and is still a strong need for a battery cell that has an electrolyte material with sufficient mechanical stability to operate at high temperatures where ionic conductivity can be optimized.

Polymeric electrolytes have been the subject of academic and commercial battery research for several years. Polymer electrolytes have been of exceptional interest partly due to their low reactivity with lithium.

During cycling, lithium metal electrodes tend to form metallic lithium filaments (or dendrites) that can grow through soft electrolyte materials and cause cell failure. When polymer electrolytes are stiff enough, they can act as barriers to the formation dendrites.

While liquid electrolytes dominate current Li-based technologies, solid electrolytes may constitute the next wave of advances for Li-based batteries. The lithium solid polymer electrolyte rechargeable battery is an especially attractive technology for Li-ion batteries because, among other benefits, the solid polymer electrolyte exhibits high thermal stability, low rates of self-discharge, stable operation over a wide range of environmental conditions, enhanced safety, flexibility in battery configuration, minimal environmental impacts, and low materials and processing costs. Moreover, solid polymer electrolytes may enable the use of lithium metal anodes, which offer higher energy densities than traditional lithium ion anodes.

BRIEF DESCRIPTION OF THE DRAWINGS

The foregoing aspects and others will be readily appreciated by the skilled artisan from the following description of illustrative embodiments when read in conjunction with the accompanying drawings.

SUMMARY

Figure 1:
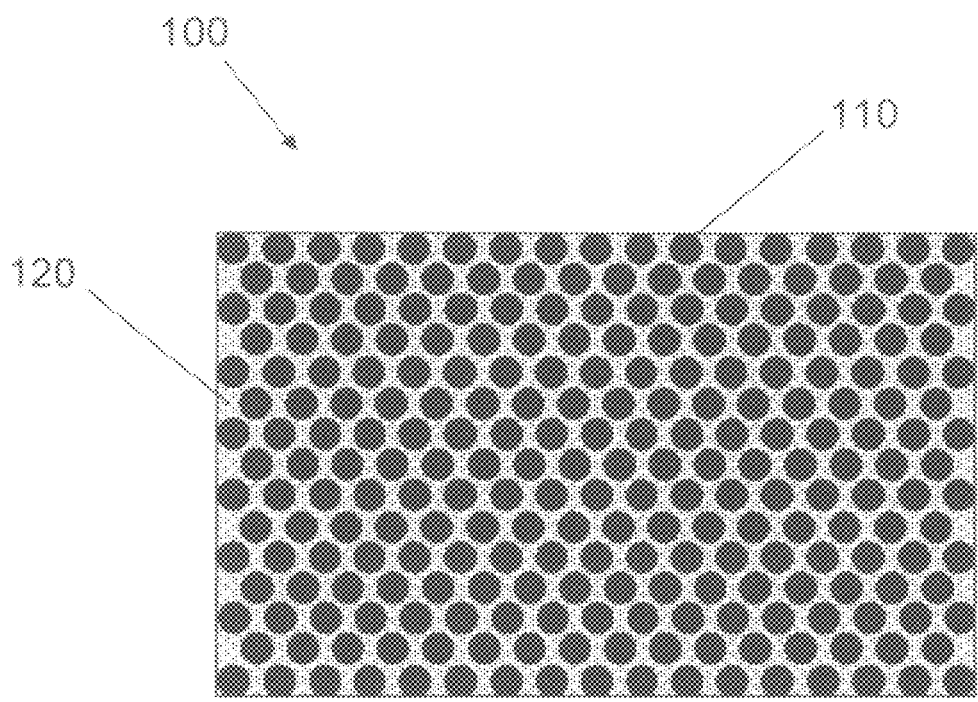
FIG. 1 is a schematic, two-dimensional, cross-sectional illustration of a composite electrolyte material, according to an embodiment of the invention.

In one embodiment of the invention, a composite electrolyte material is provided. The material has a first domain made up of randomly, close-packed spheres of a structural material and a second domain made up of the interstitial spaces between the spheres. The second domain is filled with an ionically-conductive electrolyte. In one embodiment of the invention, the structural material is a polymer. In another embodiment of the invention, the structural material is a ceramic In various arrangements, at least 50%, or at least 75%, or at least 90% of the spheres are fused to one another. In various arrangements, the spheres occupy at least 50% or at least 60% of the electrolyte material.

DETAILED DESCRIPTION

The preferred embodiments are illustrated in the context of a solid electrolyte for use in electrochemical cells. The skilled artisan will readily appreciate, however, that the materials and methods disclosed herein will have application in a number of other contexts where it is desirable to maintain many of the properties of a soft material while increasing its mechanical stiffness.

These and other objects and advantages of the present invention will become more fully apparent from the following description taken in conjunction with the accompanying drawings.

All publications referred to herein are incorporated by reference in their entirety for all purposes as if fully set forth herein.

In the past, one way to improve the mechanical properties, (e.g., stiffness) of an otherwise conductive, but soft polymer electrolyte has been to include at least two phases of disparate polymer materials in the electrolyte: a structural domain and a conductive domain. These domains have been made by a self-assembly process wherein the domains arrange themselves into a lamellar structure.

In one example, Balsara et al (U.S. patent application Ser. No. 12/225,934, filed Oct. 1, 2008, U.S. Patent Application Publication US20090263725) have used block copolymers to hybridize the mechanical properties of polystyrene (PS) with the ionically conductive properties of poly(ethylene oxide) (PEO). By using block copolymers macroscopic separation of the PS and PEO phases can be prevented. However, the synthesis of block copolymers is almost inevitably more complicated than synthesis of the corresponding homopolymers. Alternative methods to hybridize properties of the electrolyte could therefore present advantages in the manufacture of materials, if adequate performance can be maintained.

The embodiments of the invention, as disclosed herein, utilize an approach to two-phase solid-state polymer electrolytes that does not rely on using covalent connections between mechanical and ion-conducting polymer blocks to prevent macroscopic separation of the two phases. Instead, the mechanical block is synthesized independently in the form of microspheres by emulsion/suspension polymerization. The spheres are closely packed and at least partially linked together in a network to form the mechanical phase. Remaining interstitial spaces are fully interconnected. The interstitial space is filled with a polymer electrolyte, such as a mixture of PEO and LiTFSI (lithium bis(trifluoromethane sulfone)imide), thus providing a non-tortuous path for ions to move throughout the electrolyte.

The packing of closely-packed spheres was a long-standing mathematical problem, with proofs finally converging on the dual solution of face-centered cubic (fcc) or hexagonal close pack (hcp) packing, both proving that, in the ideal case, spheres occupy at most approximately a volume fraction of:

$$\pi/3\sqrt{2}=0.74048,$$

leaving an interstitial, interconnected void space accounting for the remaining 26% of the volume. But, as a practical matter, random, close-packing of spheres is not ideal. Allowing for various inevitable defects in packing, estimates for volume fractions of spheres that are randomly close-packed are closer to about 60 vol %. Thus, it can be expected that when stabilized polymeric microspheres are randomly packed together, they occupy about 60-65% of the space. The remaining volume (35-40%) is available to be filled by another material. Additional discussion of random close-packing of spheres can be found in, "A phase diagram for jammed matter," Song, Wang, and Makse, Nature 453/29, May 2008.

FIG. 1 is a two-dimensional, cross-sectional, schematic illustration that shows a polymer electrolyte, as viewed from the edge, according to an embodiment of the invention. A composite material 100 has a first domain of microspheres 110 in a close-packed arrangement, and a second domain of a solution 120 that fills interstitial space between the close-packed microspheres 110. The solution 120 can be a solid solution. In one arrangement, the microspheres 110 may or may not be conductive, but have a high elastic modulus, and the solution 120 is a conductive electrolyte. In FIG. 1 the microspheres 110 are shown not touching one another. Although in true, ideal close packing, the spheres do touch, the extra space has been included in the figure so that the second domain can be seen more clearly.

In one arrangement, the microspheres 110 are made of a cross-linked polystyrene copolymer. In other arrangements, the microspheres are made from other stiff (i.e., high elastic modulus) polymers or copolymers thereof. Examples of such polymers include, but are not limited to, hydrogenated polystyrene, polymethacrylate, poly(methyl methacrylate), polyvinylpyridine, polyvinylcyclohexane, polyimide, polyamide, polypropylene, poly (2,6-dimethyl-1,4-phenylene oxide), polyolefins, poly(t-butyl vinyl ether), poly(cyclohexyl methacrylate), poly(cyclohexyl vinyl ether), polyethylene, polyfluorocarbons, such as polyvinylidene fluoride, or copolymers that contain styrene, methacrylate, or vinylpyridine, such as poly(styrene-maleic anhydride). In general, it is useful if the microsphere material can be cross linked as that can increase the elastic modulus. Crosslinking can also prevent the spheres from dissolving in various solvents useful for processing, thereby maintaining their shape. In one arrangement, the modulus is in excess of $1\times10^5$ Pa at electrochemical cell operating temperatures. In another arrangement, the modulus is in excess of $1\times10^6$ Pa at electrochemical cell operating temperatures. In yet another arrangement, the modulus is in excess of $1\times10^7$ Pa at electrochemical cell operating temperatures. In yet another arrangement, the modulus is in excess of $1\times10^8$ Pa at electrochemical cell operating temperatures. In yet another arrangement, the modulus is in excess of $1\times10^9$ Pa at electrochemical cell operating temperatures.

In one embodiment of the invention, the microspheres are synthesized by free radical polymerization, a natural derivative of common commercial polymer synthetic methods such as emulsion, dispersion, and suspension polymerization. In such methods, free radical initiators are isolated in micellar suspensions in a solvent, and monomers are supplied to swell the micelles and to polymerize within them. Due to minimization of surface area, the micelles and the polymeric particles contained within tend to remain spherical. The spheres are stabilized in suspension by a surfactant. Adjustment of the feed rate of different monomers into the reaction allows layered particles to be constructed. Examples of such layered particles are those that have a hard, crosslinked core surrounded by uncrosslinked softer materials. Certain conditions, so-called precipitation polymerizations, can allow particles to be isolated without the use of a surfactant.

When the spheres are condensed by removing the solvent, however, surfactant alone is usually insufficient to prevent aggregation and congealing of the particles. If further stability is desired, an appropriate crosslinking agent (e.g., divinylbenzene for styrene, or ethylene glycol dimethacrylate for methyl methacrylate) can be added fractionally to the monomer feed to preserve the shape and integrity of the spherical particles. In some arrangements, water can be used as the solvent.

In another embodiment of the invention, the microspheres 110 are made of a ceramic material, such as silicon dioxide, aluminum oxide, zirconium dioxide, and titanium dioxide.]

In one arrangement, the microspheres 110 have a diameter of about 1 μm or less. In another arrangement, the microspheres have a diameter of about 500 nm or less. In another arrangement, the microspheres have a diameter of about 200 nm or less. In one embodiment of the invention, the microspheres 110 include a coating (not shown) over a core, high-elastic-modulus particle. In one arrangement, the microspheres 110 include a coating of poly-n-butylacrylate. In general, it is useful if the surfaces of the microspheres are chemically stable in the solution 120.

In one embodiment of the invention, the solution 120 is a PEO-LiTFSI solid solution. In other arrangements, the solution 120 can be made of a linear or branched polymer. Ionically conductive linear or branched polymers that can be used as the solution 120 include, but are not limited to, polyethers, polyamines, polyimides, polyamides, alkyl carbonates, polynitriles, and combinations thereof. The linear or branched polymers can also be used in combination with polysiloxanes, polyphosphazines, polyolefins, and/or polydienes to form the solution 120.

In another exemplary embodiment, the solution 120 is made of comb (or branched) polymers that have a backbone and pendant groups. Backbones that can be used in these polymers include, but are not limited to, polysiloxanes, polyphosphazines, polyethers, polydienes, polyolefins, polyacrylates, polymethacrylates, and combinations thereof. Pendants that can be used include, but are not limited to, oligoethers, substituted oligoethers, nitrile groups, sulfones, thiols, polyethers, polyamines, polyimides, polyamides, alkyl carbonates, polynitriles, other polar groups, and combinations thereof.

The composite material 100 has desirable electrolyte properties much like the block copolymer electrolytes discussed above. Block copolymer electrolytes rely on covalent links between polymer phases to prevent macrophase separation. For the composite electrolyte 100, fusing together at least a portion of the microspheres 110 at their points of contact can make a stable microsphere network that can hold the conductive solution 120 in place, preventing macrophase separation. In one arrangement the microspheres 110 can be fused together using a thermal process. In another arrangement, the microspheres 110 can be fused together using an electron-beam process. In another arrangement, the microspheres 110 can be fused together using an ultraviolet process. In another arrangement, the microspheres 110 can be fused together using a chemical treatment process. It is useful to take care that such fusion processing does not result in total fusion of the microspheres, i.e., fusion into a coherent mass with little or no space between microspheres. It is most useful to effect fusion only at the points of contact between microspheres and only to an extent that ensures the fused microspheres do not move relative to one another.

In one arrangement, essentially all microspheres 110 are fused to one another at their points of contact. In another arrangement, at least 90% of the microspheres 110 are fused to one another at their points of contact. In another arrangement, at least 75% of the microspheres 110 are fused to one another at their points of contact. In one arrangement, the microspheres 110 are coated with a reagent that aids in the fusion process. This is especially useful for microspheres that are made of materials that do not fuse easily on their own.

Inclusion of the "hard" phase in the electrolyte may make it particularly suitable for use in battery cells with lithium metal anodes. During cycling, lithium metal tends to form dendrites that can grow through soft electrolyte materials and cause cell failure. Block copolymer electrolytes that have hard PS phases and soft PEO phases can prevent the growth of lithium dendrites.

Figure 2:
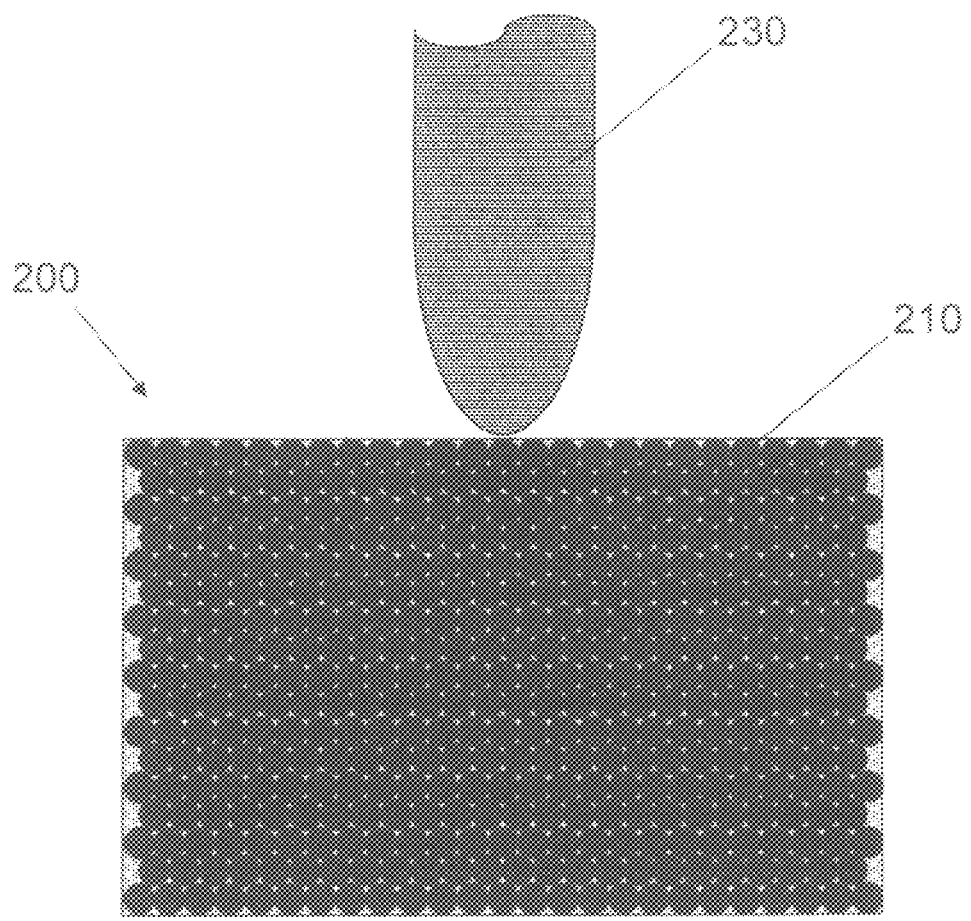
FIG. 2 is a schematic, two-dimensional, cross-sectional illustration of a lithium metal dendrite impinging upon a composite electrolyte material, according to an embodiment of the invention.

FIG. 2 is a two-dimensional, cross-sectional schematic illustration that shows the relation between an impinging dendrite 230 and the composite material (polymer electrolyte) layer 200. Generally, a lithium metal dendrite 230 has a diameter between about 0.5 and 1.5 μm. As stated above, the microspheres 210 have diameters less than about 1 μm. When the growing dendrite 230 pushes against the electrolyte 200, it cannot penetrate. The microspheres 210 are close-packed and at least a portion of the microspheres 210 are fused to one another at their points of contact, making them are essentially immobile. Such a microsphere structure is rigid and immobile enough to prevent penetration of the dendrite 230 that is much larger than the microspheres 210. Thus the dendrite 230 is prevented from growing into the electrolyte 200.

In preventing penetration of dendrites, it is also useful for the diameter of the individual microspheres 210 to be no more than about 5-10% the overall thickness of the composite electrolyte film 200, thereby ensuring that sufficient layers of microspheres are present to provide mechanical barrier properties averaged throughout the film. In an exemplary embodiment, microspheres with diameters of about 200 nm align themselves in a close packing pattern of approximately 100 layers to form a layer 20 micrometers thick. In such a layer, there is a very high density of roadblocks to dendritic growth.

Conductivity in copolymer electrolytes is a direct function of both the volume fraction of the conductive material and the tortuosity of the ionic pathways. In an exemplary lamellar block copolymer, the theoretical maximum conductivity is calculated as the product of the volume fraction of the PEO-LiTFSI (conductive) phase (approximately 0.5) and the tortuosity (approximately $2/3$) to give an expected maximum conductivity of 0.33 that of the conductive phase alone. In an exemplary randomly closely-packed microsphere composite as described herein, the theoretical maximum conductivity is the volume fraction of PEO-LiTFSI (0.35-0.40) times the tortuosity (1.0, due to full interconnectivity of the interstitial spaces), giving an expected maximum of 0.35-0.40 versus the conductive phase alone.

Although it is usually desirable to maximize conductivity in an electrolyte, there are tradeoffs to be considered. Block copolymer electrolytes can be difficult to synthesize. The individual monomers may require extreme purification processes before the block copolymers can be made. Such purification can be costly and time consuming. For some monomers, purification is an explosive process, so many safeguards must be in place, further adding to cost. Furthermore, certain block polymerizations may require radically different reaction conditions for the addition of different monomers, thereby entailing the isolation of intermediates en route to the final block copolymer. On the other hand, the composite electrolyte, as described herein, is more likely to be relatively simple to synthesize. Simpler synthesis results in reduced manufacturing costs—a very desirable outcome. The ease of synthesis of the components of the microsphere system offers the promise of a very attractive alternative to other polymer electrolyte systems, such as block copolymer systems.

In one embodiment of the invention, reproducible, dense integration of microspheres and PEO electrolyte can be achieved through extrusion processing. (In another embodiment of the invention, dense integration of microspheres and PEO electrolyte can be achieved through solution casting, especially if care is taken to ensure that voids do not form as the solvent evaporates, as this could impede ionic conduction.

Figure 3:
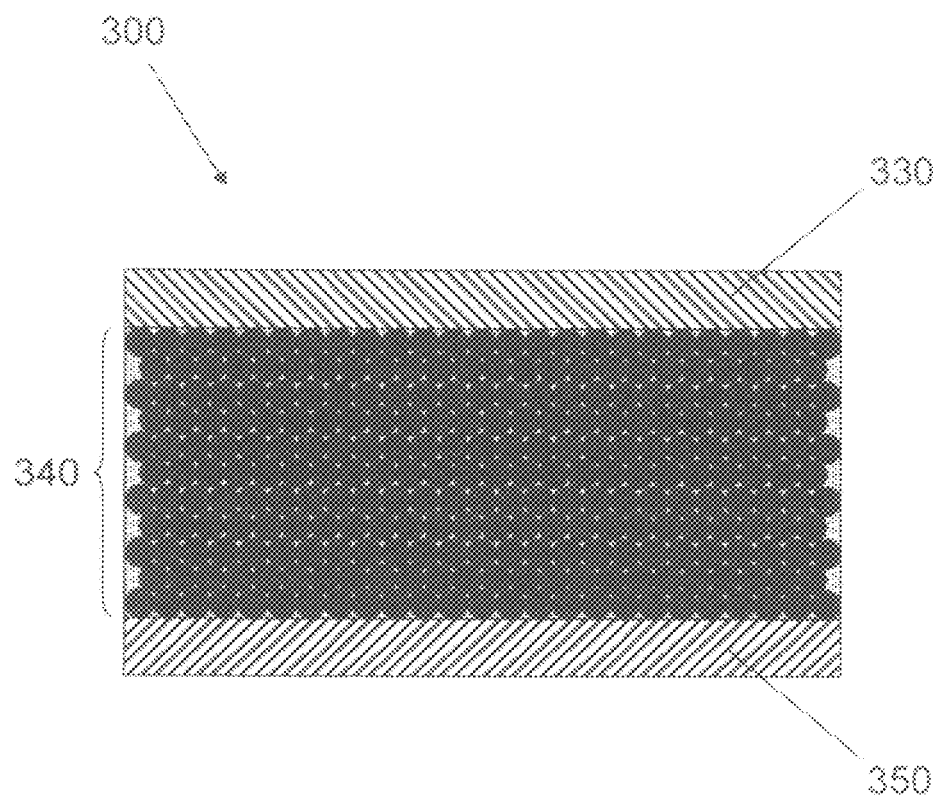
FIG. 3 is a schematic, two-dimensional, cross-sectional illustration of an electrochemical cell that employs a composite electrolyte material, according to an embodiment of the invention.

FIG. 3 is a schematic, two-dimensional, cross-sectional illustration of an electrochemical cell 300 that employs a composite electrolyte material, according to an embodiment of the invention. The cell has a series of layers in electronic and ionic communication with one another. There is an anode 330 that is physically separated from a cathode 350 by an electrolyte layer 340. In one arrangement the anode 330 is made of lithium or a lithium alloy. In another arrangement, the anode 330 is made of a material, such as carbon, that can absorb and release lithium ions. The cathode 350 is made of a material, such as a lithium metal oxide, that can absorb and release lithium ions. The electrolyte layer 340 is made of a composite material that has a structural phase of at least partially connected spheres with high elastic modulus and a conductive solution phase as described herein.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

I claim:

1. A composite electrolyte material consisting of:
a first domain consisting of randomly close-packed spheres of a structural material; and
a second domain consisting of interstitial spaces between spheres wherein the interstitial spaces contain an ionically-conductive electrolyte and a lithium salt;
wherein the ionically-conductive electrolyte is configured for use in a lithium battery cell and consists of a solution of linear or branched polymers selected from the group consisting of polyethers, polyamines, polyimides, polyamides, polynitriles, combinations thereof and polyethers, polyamines, polyimides, polyamides, polynitriles, and combinations thereof in combination with polysiloxanes, polyphosphazines, polyolefins, and/or polydienes; and
wherein the close-packed spheres occupy between 60 and 65 volume % of the composite electrolyte material.

2. The electrolyte material of claim 1 wherein the structural material has an elastic modulus in excess of $1 \times 10^7$ Pa.

3. The electrolyte material of claim 1 wherein the structural material comprises a polymer.

4. The electrolyte material of claim 1 wherein at least 50% of the spheres are fused to one another.

5. The electrolyte material of claim 1 wherein at least 75% of the spheres are fused to one another.

6. The electrolyte material of claim 1 wherein at least 90% of the spheres are fused to one another.

7. The electrolyte material of claim 3 wherein the polymer is selected from the group consisting of polystyrene, hydrogenated polystyrene, polymethacrylate, poly(methyl methacrylate), polyvinylpyridine, polyvinylcyclohexane, polyimide, polyamide, polypropylene, poly (2,6-dimethyl-1,4-phenylene oxide), polyolefins, poly(t-butyl vinyl ether), poly(cyclohexyl methacrylate), poly(cyclohexyl vinyl ether), polyethylene, fluorocarbons, such as polyvinylidene fluoride, poly(styrene-maleic anhydride); and copolymers that contain styrene, methacrylate, and vinylpyridine.

8. The electrolyte material of claim 3 wherein the polymer is crosslinked.

9. The electrolyte material of claim 8 wherein the crosslinking is achieved by inclusion of divinylbenzene or ethylene glycol dimethacrylate in the structural polymer.

10. The electrolyte material of claim 1 wherein the spheres have a diameter less than about 1 µm.

11. The electrolyte material of claim 1 wherein the spheres have a diameter less than about 500 nm.

12. The electrolyte material of claim 1 wherein the spheres have a diameter less than about 200 nm.

13. The electrolyte material of claim 1 wherein the structural material comprises a ceramic.

14. The electrolyte material of claim 13 wherein the structural ceramic material is selected from the group consisting of silicon dioxide, aluminum oxide, titanium dioxide, and zirconium oxide.

15. The electrolyte material of claim 1 wherein the lithium salt comprises LiTFSI.

16. An electrochemical cell, comprising:
an anode;
an electrolyte layer adjacent the anode, the electrolyte layer in electronic and ionic communication with the anode; and
a cathode adjacent the electrolyte layer, the cathode in electronic and ionic communication with the electrolyte layer;
wherein, the electrolyte layer comprises the electrolyte material as described in claim 1.

17. The electrochemical cell of claim 16 wherein the anode comprises lithium.

18. The electrochemical cell of claim 16 wherein the cathode comprises a lithium metal oxide.

19. A composite electrolyte material consisting of:
a first domain consisting of randomly close-packed spheres of a ceramic structural material; and
a second domain consisting of interstitial spaces between spheres wherein the interstitial spaces contain an ionically-conductive electrolyte;
wherein the ionically-conductive electrolyte is configured for use in a lithium battery cell and consists of solution of linear or branched polymers selected from the group consisting of polyethers, polyamines, polyimides, polyamides, polynitriles, and combinations thereof; and
wherein the close-packed spheres occupy between 60 and 65 volume % of the composite electrolyte material; and
wherein the spheres are not conductive.

20. The electrolyte material of claim 19 wherein the structural ceramic material is selected from the group consisting of silicon dioxide, aluminum oxide, titanium dioxide, and zirconium oxide.

21. The composite electrolyte material of claim 1, wherein the ionically-conductive electrolyte comprises PEO and the lithium salt comprises LiTFSI.

* * * * *